United States Patent [19]

Smart

[11] Patent Number: 4,775,872
[45] Date of Patent: Oct. 4, 1988

[54] SHUTTER MECHANISM

[75] Inventor: David C. Smart, Rochester, N.Y.

[73] Assignee: Eastman Kodak Company, Rochester, N.Y.

[21] Appl. No.: 146,769

[22] Filed: Jan. 22, 1988

[51] Int. Cl.⁴ .............................................. G03B 9/10
[52] U.S. Cl. .................................................... 354/252
[58] Field of Search ............................... 354/250, 252

[56] References Cited

U.S. PATENT DOCUMENTS

| | | | |
|---|---|---|---|
| 3,646,870 | 3/1972 | Koleff | 354/252 |
| 3,672,285 | 6/1972 | Stoneham | 354/250 |
| 3,816,843 | 6/1974 | Couture | 354/250 |
| 3,840,885 | 10/1974 | Yoshizaki | 354/252 |

Primary Examiner—A. A. Mathews
Attorney, Agent, or Firm—Roger A. Fields

[57] ABSTRACT

An improved shutter mechanism is disclosed which is generally of the type wherein a shutter blade is mounted for pivotal opening movement and pivotal closing movement in opposite directions about a fixed pivot to uncover and recover a lens opening, wherein a return spring biases the shutter blade in the direction of closing movement, and wherein a fixed stop is positioned to end closing movement of the blade. According to the invention, there is provided bounce control means for enabling the shutter blade to swing about the fixed stop rather than about the fixed pivot in response to a mechanical shock to the blade caused by the blade abruptly hitting the stop. This will change the direction of movement of the blade from the direction of opening movement and thereby prevent the mechanical shock from inducing the blade to bounce off the stop and uncover the lens opening. Thus, the possibility of an undesired second exposure as in prior art mechanisms is prevented.

8 Claims, 2 Drawing Sheets

SHUTTER MECHANISM

BACKGROUND OF THE INVENTION

Field of the Invention

The invention relates generally to a shutter mechanism for a photographic camera, and in particular to novel bounce control means for preventing a shutter blade at the end of its closing movement from bouncing off a fixed stop and thereby possibly uncovering the lens opening to cause an undesired second exposure.

Description of the Prior Art

A shutter mechanism may be defined conventionally as a mechanical system for controling the time during which light is allowed to reach film in a camera. The shutter mechanism consists of some means, e.g. one or more opaque blades, for normally covering a lens opening to prevent light from reaching the film, uncovering the lens opening for a pre-set time to expose the film, and recovering the lens opening to terminate the exposure.

A typical shutter mechanism commonly used in lower price cameras, and generally referred to as an "impact" or "inertial" shutter, is illustrated in FIG. 1 of the accompanying drawings. As shown, a single shutter blade 1 is mounted for pivotal opening movement and pivotal closing movement in opposite counterclockwise and clockwise directions about a fixed pivot 3 to uncover and recover a lens opening 5. A return spring 7 biases the shutter blade 1 in the direction of closing movement, and usually serves to hold the blade in a closed position against a fixed stop 9 during non-exposure periods. The fixed stop 9 is positioned in the return path of the shutter blade 1 to end closing movement of the blade.

Upon manual actuation of a shutter release in the camera, a high speed impact member or striker 11 is released to strike the shutter blade 1 in its closed position. This actuates the shutter blade 1 to swing counterclockwise in FIG. 1 about the fixed pivot 3 to a fully opened position 1'. The time during which the shutter blade 1 remains open is controlled by the return spring 7. When the shutter blade 1 is returned clockwise in FIG. 1 back to its closed position against the fixed stop 9, it is likely that the mechanical shock to the blade caused by the blade abruptly hitting the stop will induce the blade to bounce off the stop. As a result, the shutter blade 1 will swing counterclockwise in FIG. 1 possibly to a partially opened position 1", thereby effecting an undesired second exposure of the film section that was previously exposed.

SUMMARY OF THE INVENTION

The invention solves the above-described problem in connection with known impact type shutters by providing novel bounce control means for preventing a shutter blade at the end of its closing movement from bouncing off a fixed stop and thereby uncovering the lens opening to cause an undesired second exposure.

Specifically, there is provided an improved shutter mechanism generally of the type wherein (a) a shutter blade is mounted for opening movement and closing movement in opposite directions to uncover and recover a lens opening, (b) a return spring biases the shutter blade in the direction of closing movement, and (c) a fixed stop is positioned to be hit by the shutter blade to end its closing movement, and wherein the improvement comprises:

guide means for changing the direction of movement of the shutter blade to one generally transverse to the direction of opening movement in response to a mechanical shock to the blade caused by the blade hitting the fixed stop, to thereby prevent the shock from moving the blade to uncover the lens opening.

More particularly, the shutter blade is mounted to swing about a fixed pivot during its opening and closing movements to uncover and recover the lens opening. The guide means enables the shutter blade to swing about the fixed stop, rather than about the fixed pivot, in response to the mechanical shock to the blade caused by the blade hitting the stop. Thus, the blade will swing in a direction different than the direction of opening movement to prevent the blade from uncovering the lens opening.

DETAILED DESCRIPTION OF THE PREFERRED EMBODIMENT

The invention is disclosed in connection with a 35 mm still picture camera. Because such a camera is widely known, this description is directed in particular to photographic elements forming part of or cooperating directly with the invention. It is to be understood, however, that other elements not specifically shown or described may take various forms known to persons of ordinary skill in the art.

Figure 1:
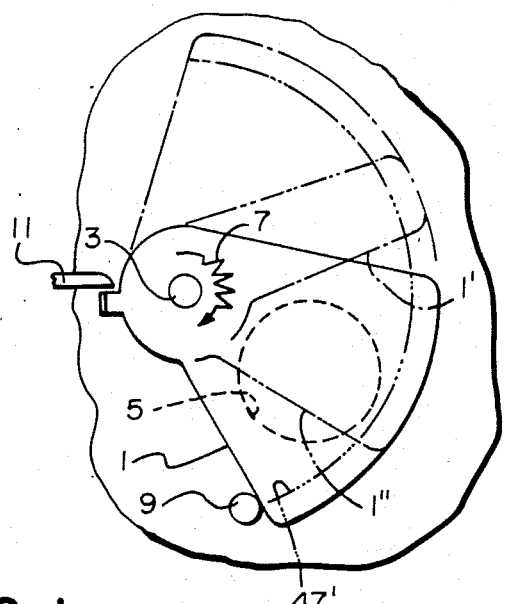
FIG. 1 is a plan view of a prior art impact shutter.

Referring now to the drawings, and in particular to FIG. 1, this FIG. depicts a prior art impact shutter which, as described above in the Description of the Prior Art, includes a single shutter blade 1 mounted for pivotal opening movement and pivotal closing movement in opposite counterclockwise and clockwise directions about a fixed pivot 3 to uncover and recover a lens opening 5. A schematically shown return spring 7 biases the shutter blade 1 in the direction of closing movement, and serves to hold the blade in a closed position against a fixed stop 9 during non-exposure periods. The fixed stop 9 is positioned in the return path of the shutter blade 1 to to end closing movement of the blade.

Upon manual actuation of a shutter release, not shown, a striker 11 is released to strike the shutter blade 1 in its closed position. This actuates the shutter blade 1 to swing counterclockwise in FIG. 1 about the fixed pivot 3 to a fully opened position 1'. The time during which the shutter blade 1 remains open is controlled by the return spring 7 as in U.S. Pat. No. 3,672,285, granted June 27, 1972. Alternatively, the time may be varied by a rebound stop, not shown, having several alternate positions. When the shutter blade 1 is returned clockwise in FIG. 1 from its fully opened position 1' back to its closed position against the fixed stop 9, it is possible that the mechanical shock to the blade caused by the blade abruptly hitting the stop will induce the blade to bounce off the stop and thereby swing counterclockwise in FIG. 1 from its closed position to a partially opened position 1″. This will cause an undesired second exposure of the film section that was previously exposed.

Figure 2:
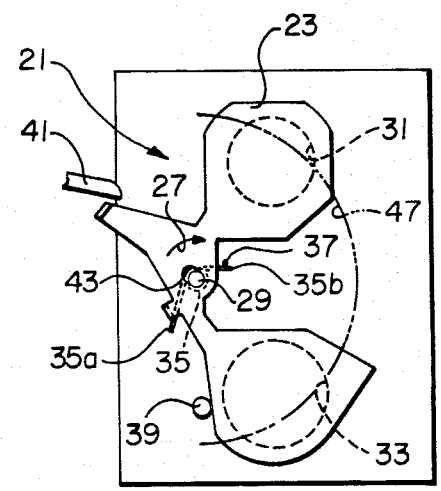
FIG. 2 is a plan view of an improved impact shutter according to a preferred embodiment of the invention, depicting a shutter blade in a closed position.
Figure 3:
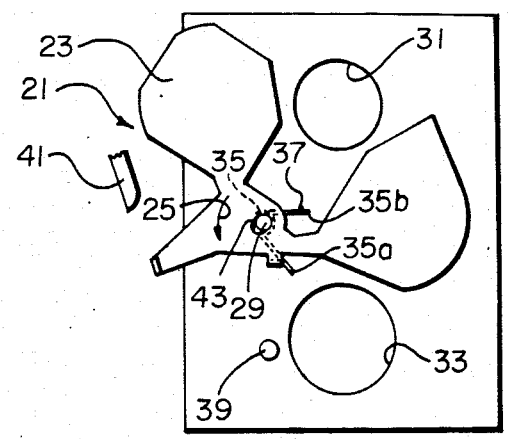
FIG. 3 is a plan view of the improved shutter, depicting the shutter blade in an opened position.
Figure 4:
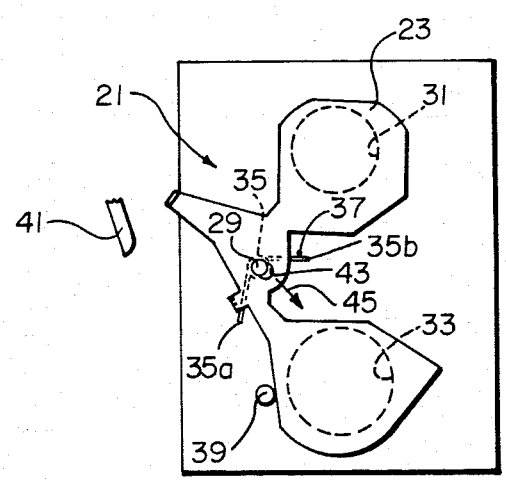
FIG. 4 is a plan view of the improved shutter, depicting the shutter blade immediately after hitting a fixed stop to end closing movement of the blade.

Turning now to the invention, FIGS. 2-4 depict an improved shutter mechanism 21 which prevents the shutter blade at the end of its closing movement from bouncing off a fixed stop and thereby uncovering a lens opening to cause an undesired second exposure.

Specifically, in FIGS. 2 and 3 there is shown a shutter blade 23 mounted for pivotal opening movement and pivotal closing movement in opposite counterclockwise and clockwise directions 25 and 27 about a fixed pivot 29 to simultaneously uncover dual lens openings 31 and 33. The lens openings 31 and 33 as can be seen in FIGS. 2 and 3 have different diameters owing to the fact that they are intended for use with two different focal length lenses, not shown. Details of the dual lens system may be found in commonly assigned copending patent application Ser. No. 143,788, filed Jan. 14, 1988 in the name of Peter Labaziewicz and entitled DUAL LENS CAMERA.

As shown in FIGS. 2 and 3, a two-legged return spring 35 tightly encircling the pivot 29 has one resilient leg 35a secured to the shutter blade 23 and another resilient leg 35b secured to a separate anchor pin 37. The spring leg 35a biases the shutter blade 23 in the direction 27 of closing movement, and serves to hold the blade in a closed position (FIG. 2) against a fixed stop 39. The fixed stop 39 is positioned in the return path of the shutter blade 1 to be hit by the blade to end its closing movement.

Upon manual actuation of a shutter release, not shown, a conventional striker 41 similar to the prior art striker 11 in FIG. 1 is released to strike the shutter blade 23 in its closed position (FIG. 2). This actuates the shutter blade 23 to swing in the direction 25 of opening movement about the fixed pivot 29 to a fully opened position (FIG. 3). The time during which the shutter blade 23 remains open is controlled by the spring leg 35a. When the shutter blade 23 is returned in the direction 27 of closing movement from its fully opened position back to its closed position (FIG. 2) against the fixed stop 39, a mechanical shock to the blade is caused by the blade abruptly hitting the stop. However, with the invention, as compared to the prior art impact shutter in FIG. 1, the shutter blade 23 will not bounce substantially off the fixed stop 39 and thereby partially uncover the lens openings 31 and 33. The reason for this appears to be as follows, in the preferred embodiment. The shutter blade 23 has a slot 43 cut in it which loosely surrounds the fixed pivot 29 and is elongated generally in a direction 45, indicated in FIG. 4, transverse to the repective directions 25 and 27 of opening and closing movements of the blade, to enable the blade to move generally in the transverse direction after it hits the fixed stop 39. Optionally, the fixed stop 39 may be positioned between the fixed pivot 29 and an arcuate line 47 along which respective points defining the center of percussion of the shutter blade 23 (at different times) are located during opening and closing movements of the blade. This is in contrast to the prior art position of the fixed stop 9 in FIG. 1 (though it may not be in contrast to other known shutter mechanisms). In FIG. 1, the fixed stop 9 is located directly on an arcuate line 47′ which corresponds to the arcuate line 47 in FIG. 4. A definition of the "center of percussion" may be found in "Machinery's Handbook" by Oberg, Jones and Horton, Industrial Press Inc., twentieth edition 1976.

In response to the mechanical shock to the shutter blade 23 caused by the blade hitting the fixed stop 39, the blade will swing about the stop, generally in the direction 45, to the extent limited by the slot 43, as shown in FIG. 4. Consequently, the shutter blade 23 will swing in a direction different than the direction 25 of opening movement, and it will not uncover the lens openings 31 and 33. At the same time, the spring leg 35a will act to dampen or retard movement of the shutter blade in the direction 45, to thereby dissipate the energy resulting from the mechanical shock to the blade. When this energy is completely absorbed, the spring leg 35a will park the shutter blade 23 in its closed position (FIG. 1).

The invention has been described with reference to a preferred embodiment. However, it will be appreciated that variations and modifications can be effected within the ordinary skill in the art without departing from the scope of the invention. For example, instead of utilizing the invention with a shutter blade that is mounted for pivotal opening and closing movements as in FIGS. 2-4, the invention could be utilized with a shutter blade that is mounted for translational opening and closing movements.

I claim:

1. An improved shutter mechanism of the type wherein (a) a shutter blade is mounted for opening movement and closing movement in opposite directions to uncover and recover a lens opening, (b) a return spring biases said shutter blade in the direction of closing movement, and (c) a fixed stop is positioned to be hit by said shutter blade to end its closing movement, and wherein the improvement comprises:

guide means for changing the direction of movement of said shutter blade to one generally transverse to the direction of opening movement in response to a mechanical shock to the blade caused by the blade hitting said fixed stop, to thereby prevent the shock from moving the blade to uncover said lens opening.

2. The improvement as recited in claim 1, wherein a fixed member supports said shutter blade for its opening and closing movements, and said guide means includes a slot cut in the blade in loose surrounding relation to said fixed member, said slot being elongated in said direction generally transverse to the direction of opening movement of the blade to enable the blade to move in the transverse direction.

3. The improvement as recited in claim 2, wherein said spring is connected to said shutter blade and to said fixed member to resist movement of the blade in said transverse direction.

4. An improved shutter mechanism of the type wherein (a) a shutter blade is mounted for pivotal opening movement and pivotal closing movement in opposite directions about a fixed axis to uncover and recover a lens opening, (b) a return spring biases said shutter blade in the direction of closing movement, and (c) a fixed stop is positioned to be hit by said shutter blade to end its closing movement, and wherein the improvement comprises:

means for enabling said shutter blade to swing about said fixed stop rather than about said fixed axis in response to a mechanical shock to the blade caused by the blade hitting the stop, to change the direction of movement of the blade from the direction of opening movement and thereby prevent the shock from inducing the blade to bounce off the stop and uncover said lens opening.

5. The improvement as recited in claim 4, wherein a fixed pivot supports said shutter blade for its opening and closing movements about said fixed axis, and said enabling means includes a slot cut in the blade in loose surrounding relation to said fixed pivot, said slot being elongated generally in a direction transverse to the respective directions of opening and closing movements of the blade to permit the blade to swing about said fixed stop.

6. The improvement as recited in claim 5, wherein said enabling means includes positioning means for positioning said fixed stop between said fixed axis and an arcuate line along which respective points defining the center of percussion of said shutter blade are located during opening and closing movements of the blade.

7. The improvement as recited in claim 6, wherein said return spring includes a resilient leg connected to said shutter blade and to said fixed pivot to resist movement of the blade about said fixed stop in said direction transverse to the respective directions of opening and closing movements of the blade.

8. An improved shutter mechanism of the type wherein (a) a shutter blade is mounted for pivotal opening movement and pivotal closing movement in opposite directions about a fixed pivot to uncover and recover a lens opening, (b) a return spring biases said shutter blade in the direction of closing movement, and (c) a fixed stop is positioned to be hit by said shutter blade to end its closing movement, and wherein the improvement comprises:

means for shifting the pivot axis of said shutter blade from said fixed pivot to said fixed stop in response to a mechanical shock to the blade caused by the blade hitting the stop, to enable the blade to swing about the stop rather about than the pivot and thereby prevent the shock from inducing the blade to bounce off the stop and uncover said lens opening.

* * * * *